United States Patent [19]

Takayanagi

[11] Patent Number: 4,645,982
[45] Date of Patent: Feb. 24, 1987

[54] LOAD CONTROL UNIT IN AN IMAGE FORMING APPARATUS

[75] Inventor: Yoshiaki Takayanagi, Ichikawa, Japan

[73] Assignee: Canon Kabushiki Kaisha, Tokyo, Japan

[21] Appl. No.: 549,459

[22] Filed: Nov. 7, 1983

[30] Foreign Application Priority Data

Nov. 15, 1982 [JP]  Japan .................................. 57-200070
Jan. 10, 1983 [JP]  Japan ...................................... 58-2402

[51] Int. Cl.$^4$ .................... G05F 1/00; H05B 37/02; H05B 39/04; H05B 41/36
[52] U.S. Cl. ...................................... 315/307; 355/67; 315/308; 315/310; 315/291; 315/DIG. 7
[58] Field of Search ............... 315/307, 308, 309, 310, 315/DIG. 7, 291, 299, 293; 355/69; 354/425, 426, 427

[56] References Cited

U.S. PATENT DOCUMENTS

| | | | |
|---|---|---|---|
| 3,590,316 | 6/1971 | Engel | 315/308 |
| 4,037,148 | 7/1977 | Owens et al. | 315/308 |
| 4,237,405 | 12/1980 | Kellis | 315/DIG. 7 |
| 4,356,433 | 10/1982 | Linden | 315/308 |
| 4,359,670 | 11/1982 | Hosaka et al. | 315/307 |
| 4,370,601 | 1/1983 | Horii et al. | 315/307 |
| 4,475,065 | 10/1984 | Bhalla | 315/308 |
| 4,501,994 | 2/1985 | Spreadbury | 315/308 |

*Primary Examiner*—Saxfield Chatmon
*Attorney, Agent, or Firm*—Fitzpatrick, Cella, Harper & Scinto

[57] ABSTRACT

A load control unit in an image forming apparatus has a control circuit for controlling energization to a load in accordance with a power supply voltage. The control circuit converts the power supply voltage to non-linear data and controls the energization of the load in accordance with the non-linear data.

25 Claims, 10 Drawing Figures

LOAD CONTROL UNIT IN AN IMAGE FORMING APPARATUS

BACKGROUND OF THE INVENTION

1. Field of the Invention

The present invention relates to a control unit for controlling the drive of loads, such as a light source and a heat source, in an image forming apparatus, such as copying machine or facsimile.

2. Description of the Prior Art

A copying machine for copying an original image has loads activated by energization, such as a halogen lamp for illuminating an original document and a fixing heater for firing a copied image.

The halogen lamp must illuminate at a predetermined light intensity in order to attain a desired image density. Accordingly, the energization of the halogen lamp is controlled by a control circuit called a lamp regulator to maintain a constant level of light intensity. However, a lamp regulator cannot sufficiently compensate for a large or abrupt change in a power supply voltage.

A lamp regulator usually detects a mean value of the power supply voltage and controls the energization based on the mean value. However, since the light intensity of the halogen lamp is related to an effective value of the power supply voltage (applied voltage), such a light intensity control attains only approximate control.

In order to eliminate such an error, a lamp regulator has been proposed, in which a circuit configuration is improved such that the light intensity control by the detected mean value approaches the effective value. However, the circuit configuration is complex and cost increases.

It has also been proposed to control the energization of the load by digital operation using a microcomputer. However, the processing capability of the microcomputer may not be large enough to satisfy the requirement of precisely controlling a wide control range of an object, or a large portion of a memory of the microcomputer may be used for the control and other controls are not sufficiently attained.

SUMMARY OF THE INVENTION

It is an object of the present invention to provide a load control unit in an image forming apparatus which can precisely control the drive of a load such as a light source without a control circuit, such as a lamp regulator.

It is another object of the present invention to provide a control unit which controls the drive of a load to follow an effective value of a voltage.

It is other object of the present invention to provide a control unit which controls the drive of a load by a microcomputer.

The above and other objects and advantages of the present invention will be apparent from the following detailed description of the invention.

DETAILED DESCRIPTION OF THE PREFERRED EMBODIMENTS

In the following embodiments, the load to be controlled is a halogen lamp for illuminating an original document of a copying machine.

Figure 1:
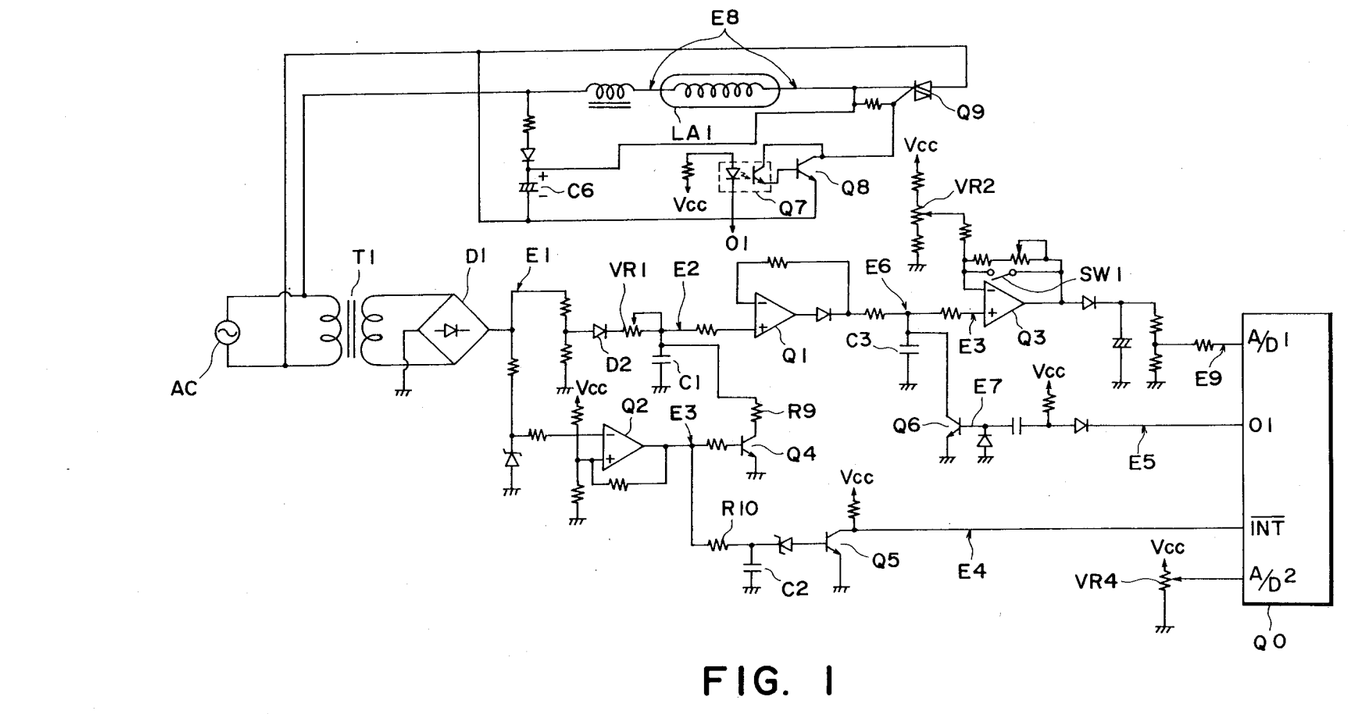
FIG. 1 is a circuit diagram of one embodiment of a light intensity control unit for a halogen lamp, in accordance with the present invention.
Figure 2:
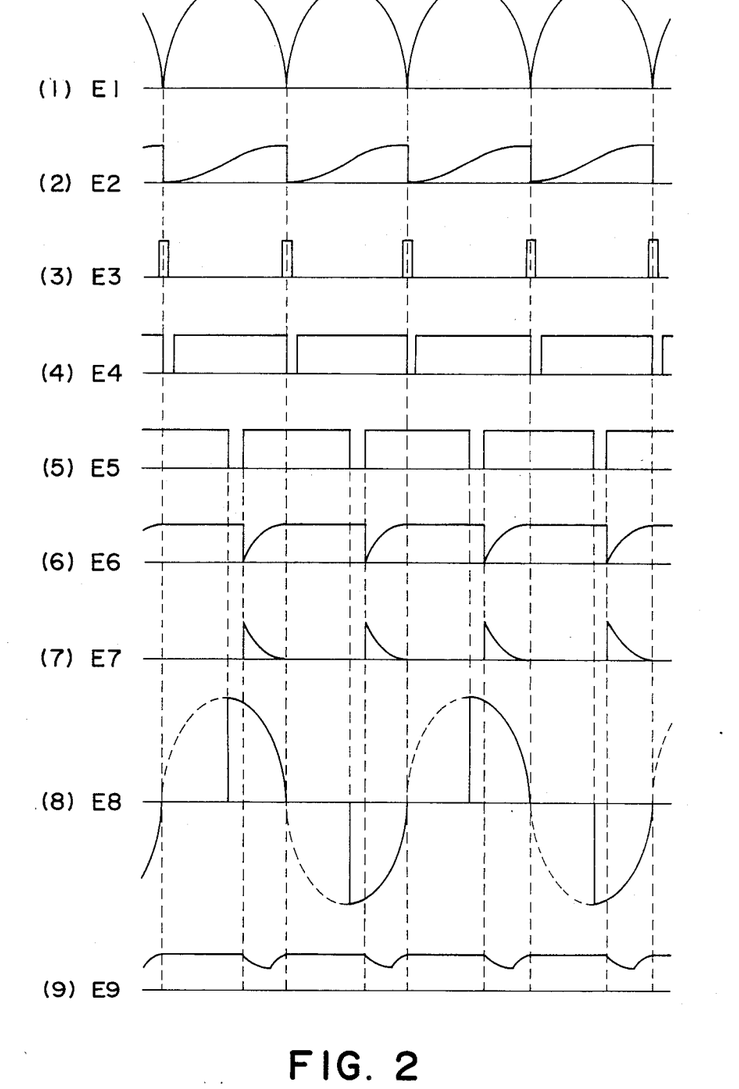
FIG. 2 shows waveforms in the circuit of FIG. 1.

FIG. 1 is a block diagram of a first embodiment of a light intensity control circuit for a halogen lamp for illuminating an original document in a copying machine, in accordance with the present invention, and FIG. 2 shows waveforms at points E1–E9 in the circuit of FIG. 1.

$Q_0$ denotes a microcomputer having an analog-to-digital conversion function, for example, Fujitsu MB 88410.

T1 denotes a transformer for monitoring an AC power supply voltage and generating a zero-crossing pulse. An AC power supply AC is supplied to the transformer T1 and an output thereof is full-wave rectified by rectifier D1 as shown in FIG. 2(1). The full-wave rectified output charges up a capacitor C1 through a diode D2 and a potentiometer VR1. The power supply voltage is monitored based on the charge potential.

The output of the full-wave rectifier D1 is also supplied to a comparator Q2 where it is compared with a reference potential so that a zero-crossing pulse as shown in FIG. 2(3) is generated. The zero-crossing pulse is supplied to a transistor Q4 which forms discharge path to the capacitor C1 so that the capacitor C1 is discharged when the zero-crossing pulse is generated. FIG. 2(2) shows the charge and discharge status of the capacitor C1.

The zero-crossing pulse from the comparator Q2 is delayed by a resistor R10 and a capacitor C2 such that a rising edge of the pulse coincides with actual 0-volt timing of the power supply voltage to produce a zero-crossing signal. The zero-crossing signal is then inverted by a transistor Q5 as shown in FIG. 2(4) and the inverted signal is applied to an interrupt terminal $\overline{INT}$ of a microcomputer $Q_0$. It is used as a timing signal to start a phase control to be described later.

As described above, the charge voltage of the capacitor C1 is latched in a capacitor C3 through an operational amplifier Q1. As shown in FIG. 2(6), the capacitor C3 is discharged when a transistor Q6 is turned on by a rising signal (FIG. 2(7)) of a halogen lamp on signal (FIG. 2(5)) from an output terminal $Q_1$ of the microcomputer $Q_0$, and then it starts to latch next half cycle of voltage.

The latched voltage of the capacitor C3 is applied to an operational amplifier Q3. A gain of the operational amplifier Q3 is adjusted by a potentiometer VR2 to set a center value of a detection voltage Vin applied to an analog-to-digital conversion terminal A/D 1 of the microcomputer $Q_0$.

A switch SW1 is closed when the operational amplifier Q3 is used as a voltage follower. By closing the switch SW1 and adjusting the potentiometer VR1, an A/D converted value for a given input power supply voltage is calibrated.

Connected to another analog-to-digital conversion terminal A/D 2 of the microcomputer $Q_0$ is a light intensity setter having a potentiometer VR4 linked to a density control lever located on a control panel of a copying machine. A setting voltage $V_0$ corresponding to a desired light intensity is applied to the terminal A/D 2.

LA1 denotes a halogen lamp. The light intensity of the halogen lamp LA1 is controlled by phase control by turn-on and turn-off of a Triac Q9, which is triggered when the halogen lamp on signal (FIG. 2(5)) from the output terminal $O_1$ of the microcomputer $Q_0$ falls to a low level and a photo-coupler Q7 is activated to turn on a transistor Q8 to discharge the capacitor C6. The Triac Q9 thus phase-controls the AC power supply supplied to the halogen lamp LA1 as shown in FIG. 2(8).

As described above, the detected input power supply voltage Vin is applied to the terminal A/D 1 of the microcomputer $Q_0$ and the setting voltage $V_0$ is applied to the terminal A/D 2, and they are converted to analog signals. The microcomputer $Q_0$ processes the voltages Vin and $V_0$ to determine an output timing of the halogen lamp on signal (FIG. 2(5)) used for the phase control, that is, a phase angle of the phase control, for controlling the light intensity of the halogen lamp LA1.

The method for determining the phase angle of the phase control by the microcomputer $Q_0$ based on the A/D converted setting voltage $V_0$ and the A/D converted detection voltage Vin is now explained.

Figure 3:
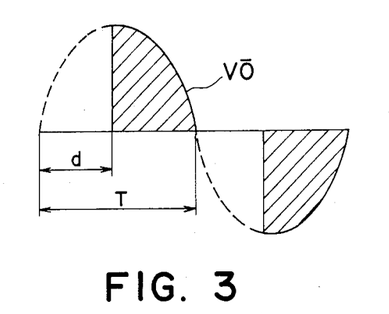
FIG. 3 shows a waveform of a phase-controlled AC power supply.

FIG. 3 shows a waveform of a phase-controlled AC power supply. The letter T represents one half period of the AC power supply and $\alpha$ is a phase angle time. A relation between the detected input power supply voltage Vin and the effective value Vout of the phase-controlled AC power supply is expressed by a formula (1);

$$V_{out} = V_{in} \sqrt{(1-x) + \frac{1}{2\pi} \sin 2\pi x} \quad (1)$$

where $x = \alpha/T$

Assuming that the control is effected such that the effective value Vout of the phase-controlled AC power supply is equal to the setting voltage $V_0$ set by the potentiometer VR4, Vout=V4. Thus, $$\frac{V_{in}}{V_0} = \frac{1}{\sqrt{(1+x) + \frac{1}{2\pi}\sin 2\pi x}} \quad (2)$$

By logarithming the both sides, $$\log V_{in} - \log V_0 = -\log \sqrt{(1-x) + \frac{1}{2\pi} \sin 2\pi x} \quad (3)$$

By multiplying a coefficient, e.g. 670 to the both sides, $$670(\log V_{in} - \log V_0) = -670 \log \sqrt{(1+x) + \frac{1}{2\pi} \sin 2\pi x} \quad (4)$$

By putting log 80 as a constant, $$670(\log V_{in} - \log 80) + (\log 80 - \log V_0) = \quad (5)$$
$$-670 \log \sqrt{(1-x) + \frac{1}{2\pi} \sin 2\pi x}$$

The first term and the second term of the left side of the equation (5) are rounded by counting fractions of 0.5 and over as a whole number and disregarding the rest. They are represented as follows.

$$LOG\ V_{in} = 670(\log V_{in} - \log 80) \quad (6)$$

$$LOG\ V_0 = 670(\log 80 - \log V_0) \quad (7)$$

The right side of the equation (5) is rounded in the same fashion, as shown below.

$$F(N) = -670 \log \sqrt{(1-x) + \frac{1}{2\pi} \sin 2\pi x} \quad (8)$$

Where N is the count of clock pulses of an internal timer in the microcomputer $Q_0$ corresponding to the phase angle control time $\alpha$. Accordingly the equation (5) is expressed by $$LOG\ V_{in} + LOG\ V_0 = F(N) \quad (9)$$

A table for outputting the data LOG Vin when addressed by the A/D converted input voltage Vin, a table for outputting the data LOG $V_0$ when addressed by the A/D converted setting voltage $V_0$ and a table for outputting the count N of the clock pulses when addressed by the sum data of the LOG Vin and the LOG $V_0$ are stored in a memory ROM of the microcomputer $Q_0$ so that a phase control data is produced in accordance with the input power supply voltage and the setting voltage.

The coefficient, e.g. 670 in the equation (4) and the constant, e.g. log 80 in the equation (5) are set such that the logarithmic value is converted to an integer which can be expressed by the bits which can be A/D converted by the microcomputer, for example, eight bits. In the present embodiment, a range of the input power supply voltage is set to 50-80 volts, and the coefficient is set to 670 and the constant is set to log 80. Tables 1-3 show the tables stored in the ROM.

TABLE 1

| Vin | A/D converted Value | | | | LOG Vin |
|---|---|---|---|---|---|
| 80.0 | 1 | 0 | 0 | 0 | 0 |
| 80.2 | 1 | 0 | 1 | 0 | 1 |
| 80.4 | 1 | 0 | 2 | 0 | 1 |
| 80.6 | 1 | 0 | 3 | 0 | 2 |
| 80.8 | 1 | 0 | 4 | 0 | 3 |
| 81.0 | 1 | 0 | 5 | 0 | 4 |
| 81.2 | 1 | 0 | 6 | 0 | 4 |
| 81.4 | 1 | 0 | 7 | 0 | 5 |
| 81.6 | 1 | 0 | 8 | 0 | 6 |
| 81.8 | 1 | 0 | 9 | 0 | 6 |
| 82.0 | 1 | 0 | A | 0 | 7 |
| 82.2 | 1 | 0 | B | 0 | 8 |
| 82.4 | 1 | 0 | C | 0 | 9 |
| ∫ | ∫ | ∫ | ∫ | ∫ | ∫ |
| 99.6 | 1 | 6 | 2 | 4 | 0 |
| 99.8 | 1 | 6 | 3 | 4 | 0 |
| 100.0 | 1 | 6 | 4 | 4 | 1 |
| 100.2 | 1 | 6 | 5 | 4 | 2 |

TABLE 1-continued

| Vin | A/D converted Value | | | LOG Vin | |
|---|---|---|---|---|---|
| 100.4 | 1 | 6 | 6 | 4 | 2 |
| ∫ | ∫ | ∫ | ∫ | ∫ | ∫ |
| 117.6 | 1 | B | C | 7 | 0 |
| 117.8 | 1 | B | D | 7 | 1 |
| 118.0 | 1 | B | E | 7 | 1 |
| 118.2 | 1 | B | F | 7 | 2 |
| 118.4 | 1 | C | 0 | 7 | 2 |
| 118.6 | 1 | C | 1 | 7 | 3 |
| 118.8 | 1 | C | 2 | 7 | 3 |
| 119.0 | 1 | C | 3 | 7 | 4 |
| 119.2 | 1 | C | 4 | 7 | 4 |
| 119.4 | 1 | C | 5 | 7 | 5 |
| 119.6 | 1 | C | 6 | 7 | 5 |
| 119.8 | 1 | C | 7 | 7 | 5 |
| 120.0 | 1 | C | 8 | 7 | 6 |

TABLE 2

| $V_0$ | A/D converted Value | | | LOG $V_0$ | |
|---|---|---|---|---|---|
| 50.0 | 0 | 0 | 0 | 8 | 9 |
| 50.5 | 0 | 0 | 1 | 8 | 6 |
| 51.0 | 0 | 0 | 2 | 8 | 3 |
| 51.5 | 0 | 0 | 3 | 8 | 0 |
| 52.0 | 0 | 0 | 4 | 7 | D |
| 52.5 | 0 | 0 | 5 | 7 | B |
| 53.0 | 0 | 0 | 6 | 7 | 0 |
| 53.5 | 0 | 0 | 7 | 7 | 5 |
| 54.0 | 0 | 0 | 8 | 7 | 2 |
| 54.5 | 0 | 0 | 9 | 7 | 0 |
| 55.0 | 0 | 0 | A | 6 | D |
| 55.5 | 0 | 0 | B | 6 | A |
| 56.0 | 0 | 0 | C | 6 | 9 |
| ∫ | ∫ | ∫ | ∫ | ∫ | ∫ |
| 64.0 | 0 | 1 | C | 4 | 1 |
| 64.5 | 0 | 1 | D | 3 | F |
| 65.0 | 0 | 1 | E | 3 | C |
| 65.5 | 0 | 1 | F | 3 | A |
| 66.0 | 0 | 2 | 0 | 3 | 8 |
| . | . | . | . | . | . |
| 74.0 | 0 | 3 | 0 | 1 | 7 |
| 74.5 | 0 | 3 | 1 | 1 | 5 |
| 75.0 | 0 | 3 | 2 | 1 | 3 |
| 75.5 | 0 | 3 | 3 | 1 | 1 |
| 76.0 | 0 | 3 | 4 | 0 | F |
| 76.5 | 0 | 3 | 5 | 0 | D |
| 77.0 | 0 | 3 | 6 | 0 | B |
| 77.5 | 0 | 3 | 7 | 0 | 9 |
| 78.0 | 0 | 3 | 8 | 0 | 7 |
| 78.5 | 0 | 3 | 9 | 0 | 6 |
| 79.0 | 0 | 3 | A | 0 | 4 |
| 79.5 | 0 | 3 | B | 0 | 2 |
| 80.0 | 0 | 3 | C | 0 | 0 |

TABLE 3

| LOG Vin + LOG $V_0$ | | | Timer Count N |
|---|---|---|---|
| 2 | 0 | 0 | $N_{00}$ |
| 2 | 0 | 1 | $N_{01}$ |
| 2 | 0 | 2 | $N_{02}$ |
| 2 | 0 | 3 | $N_{03}$ |
| 2 | 0 | 4 | $N_{04}$ |
| 2 | 0 | 5 | $N_{05}$ |
| 2 | 0 | 6 | $N_{06}$ |
| 2 | 0 | 7 | $N_{07}$ |
| 2 | 0 | 8 | $N_{08}$ |
| 2 | 0 | 9 | $N_{09}$ |
| 2 | 0 | A | $N_{0A}$ |
| 2 | 0 | B | $N_{0B}$ |
| 2 | 0 | C | $N_{0C}$ |

TABLE 3-continued

| LOG Vin + LOG $V_0$ | | | Timer Count N |
|---|---|---|---|
| ∫ | ∫ | ∫ | ∫ |
| 2 | 7 | D | $N_{7D}$ |
| 2 | 7 | E | $N_{7E}$ |
| 2 | 7 | F | $N_{7F}$ |
| 2 | 8 | 0 | $N_{80}$ |
| 2 | 8 | 1 | $N_{81}$ |
| ∫ | ∫ | ∫ | ∫ |
| 2 | F | 3 | $N_{F3}$ |
| 2 | F | 4 | $N_{F4}$ |
| 2 | F | 5 | $N_{F5}$ |
| 2 | F | 6 | $N_{F6}$ |
| 2 | F | 7 | $N_{F7}$ |
| 2 | F | 8 | $N_{F8}$ |
| 2 | F | 9 | $N_{F9}$ |
| 2 | F | A | $N_{FA}$ |
| 2 | F | B | $N_{FB}$ |
| 2 | F | C | $N_{FC}$ |
| 2 | F | D | $N_{FD}$ |
| 2 | F | E | $N_{FE}$ |
| 2 | F | F | $N_{FF}$ |

The columns of the A/D converted value LOG Vin in Table 1, the A/D converted value LOG $V_0$ in Table 2 and LOG Vin+LOG $V_0$ in Table 3 are shown by a hexadecimal numbers. In Table 1, the input power supply voltage Vin applied to the terminal A/D 1 of the microcomputer $Q_0$ is converted to an 8-bit binary data at a step of 0.2 volt. A bit "1" coded to the head of each of the 8-bit data to produce "100"–"1C8", which are used as addresses to look up the table of FIG. 1 to obtain the LOG Vin for the input power supply voltage Vin.

In Table 2, the setting voltage applied to the terminal A/D 2 of the microcomputer $Q_0$ is converted to an 8-bit binary data at a step of 0.5 volt. A bit "0" is added to the head of each of the 8-bit data to produce "000"–"03C", which are used as the ROM addresses to look up the table of Table 2 to obtain LOG $V_0$ for the setting voltage $V_0$.

A bit "2" is added to the head of each of the sums of LOG Vin and LOG $V_0$ to produce "200"–"2FF", which are used as the addresses to look up the table of Table 3 to obtain the timer count N. The timer count N thus obtained corresponds to the phase angle for the phase control, determined by the logarithmic values of the input power supply voltage Vin and the setting voltage $V_0$.

Figure 4A:
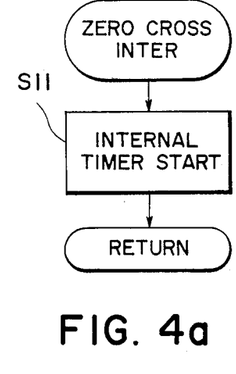
FIGS. 4a to 4c are flow charts showing one embodiment of a program for controlling turn-on of the halogen lamp.
Figure 4B:
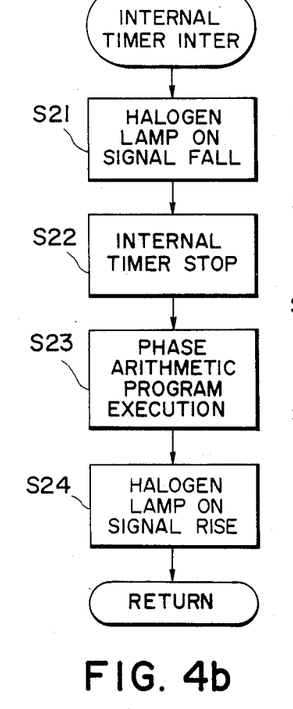
Figure 4C:
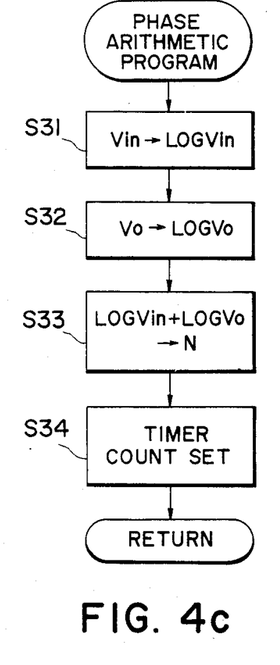

FIG. 4 shows a flow chart of a halogen lamp turn-on control program in the present embodiment. This program is stored in the ROM of the microcomputer $Q_0$.

When the zero-crossing signal is applied to the interrupt terminal INT of the microcomputer $Q_0$ a zero-crossing interrupt routine of FIG. 4(a) is accessed. In the zero-crossing interrupt routine, an internal timer for phase-controlling the halogen lamp is started in a step S11.

When the count of the internal timer started in the zero-crossing interrupt routine reaches a timer count determined by a phase control program to be described later, an internal timer interrupt routine of FIG. 4(b) is accessed. In the internal timer interrupt routine, a halogen lamp-on signal is made to fall to turn on the halogen lamp LA1. As it falls, the Triac Q9 is turned on to energize the halogen lamp LA1. In a step S22, the internal timer is stopped. In a step S23, the phase control program is executed to determine the timer count N. In a step S24, the halogen lamp-on singal is raised to discharge the capacitor C3.

FIG. 4(c) shows the phase control program to determine the timer count N. In the phase control program, the three tables (Tables 1-3) described above and stored in the ROM are looked up to determine the timer count N.

In a step S31, the table (Table 1) in the ROM is looked up by the A/D converted value of the detected voltage Vin applied to the terminal A/D 1 of the microcomputer $Q_0$ to obtain the logarithmic value LOG Vin. In a step S32, the table (Table 2) of the ROM is looked up by the A/D converted value of the setting voltage $V_0$ applied to the terminal A/D 2 to obtain the logarithmic value LOG $V_0$. In a step S33, the table (Table 3) of the ROM is looked up by the sum of LOG Vin and LOG $V_0$ obtained in the steps S31 and S32 to obtain the timer count N. In a step S34, the timer count N obtained in the step S33 is set to the internal timer.

In this manner, the phase control of the power supplied to the halogen lamp LA1 is effected by the program shown in FIG. 4.

While the turn-on control of the halogen lamp for illuminating the original document of the copying machine is shown in the present embodiment, the present invention can be applied to various controls of the image forming apparatus such as control of a light source other than the halogen lamp, such as an incandescent lamp, the control of a heat source, such as a heater, and a rotation control to a motor.

The microcomputer need not contain the analog-to-digital converters. In this case, the input voltage and the setting voltage are applied to the microcomputer through analog-to-digital converters.

As described hereinabove, the present embodiment does not need the control circuit such as lamp regulator and more accurate energization control is attained with a lower cost than the control unit having such a control circuit. By changing the tables stored in the ROM of the microcomputer, various controls can be readily attained. By handling the control input data in non-linear form, that is in logarithmic form, the area of the ROM required for the control is reduced and hence the memory capacity is saved.

By obtaining the non-linear data by looking up the tables in the ROM, the processing of the non-linear data is not necessary, the processing speed is increased, and the processing procedure is simplified.

Figure 5:
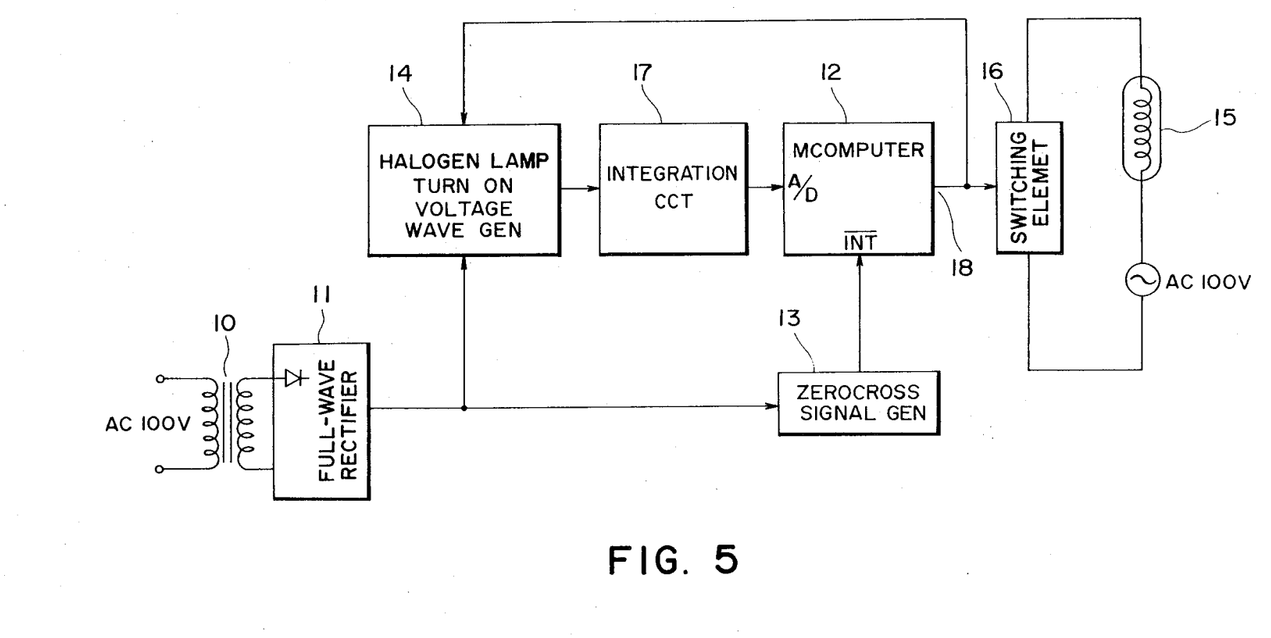
FIG. 5 is a block diagram of another embodiment of the halogen lamp control circuit of the present invention.

FIG. 5 shows a block diagram of a second embodiment of the lamp light intensity control circuit of the present invention.

A commercial AC power supply of 100 volts is supplied to a halogen voltage monitoring transfer 10 and a predetermined voltage output of e.g. 80 volts is produced in a secondary winding thereof. The secondary winding output of the transformer 10 is full-wave rectified by a full-wave rectifier 11 and the output of the rectifier 11 is applied to a circuit 13 for generating a zero-crossing signal which is applied to an interrupt terminal $\overline{INT}$ of a one-chip microcomputer 12 containing an A/D converter (e.g. Fujitsu MB 88410). The output of the rectifier 11 is also applied to a halogen lamp turn-on voltage generator 14.

The microcomputer 12 issues trigger signal 18 for a semiconductor switching device which phase-controls the AC power supply applied to a halogen lamp 15. The trigger signal 18 is also applied to the halogen lamp turn-on voltage generator 14 where it is used as a trigger signal to phase control voltage waveform full-wave rectified by the full-wave rectifier 11. Thus, the full-wave rectified monitoring voltage waveform is phase-controlled by the phase-control trigger signal 18 of the halogen lamp 15 so that a voltage output analogous to the effective voltage applied to the halogen lamp 15 is applied to an integration circuit 17. The integration circuit 17 integrates the output of the halogen lamp turn-on voltage generator 14 and the integrated output is applied to an analog-to-digital conversion terminal A/D of the microcomputer 12 as a monitor voltage.

The microcomputer 12 determines an output timing of the trigger signal 18 to phase-control the energization of the halogen lamp 15 based on the zero-crossing signal applied to the terminal $\overline{INT}$ and the monitor voltage applied to the terminal A/D at a predetermined timing.

Figure 6:
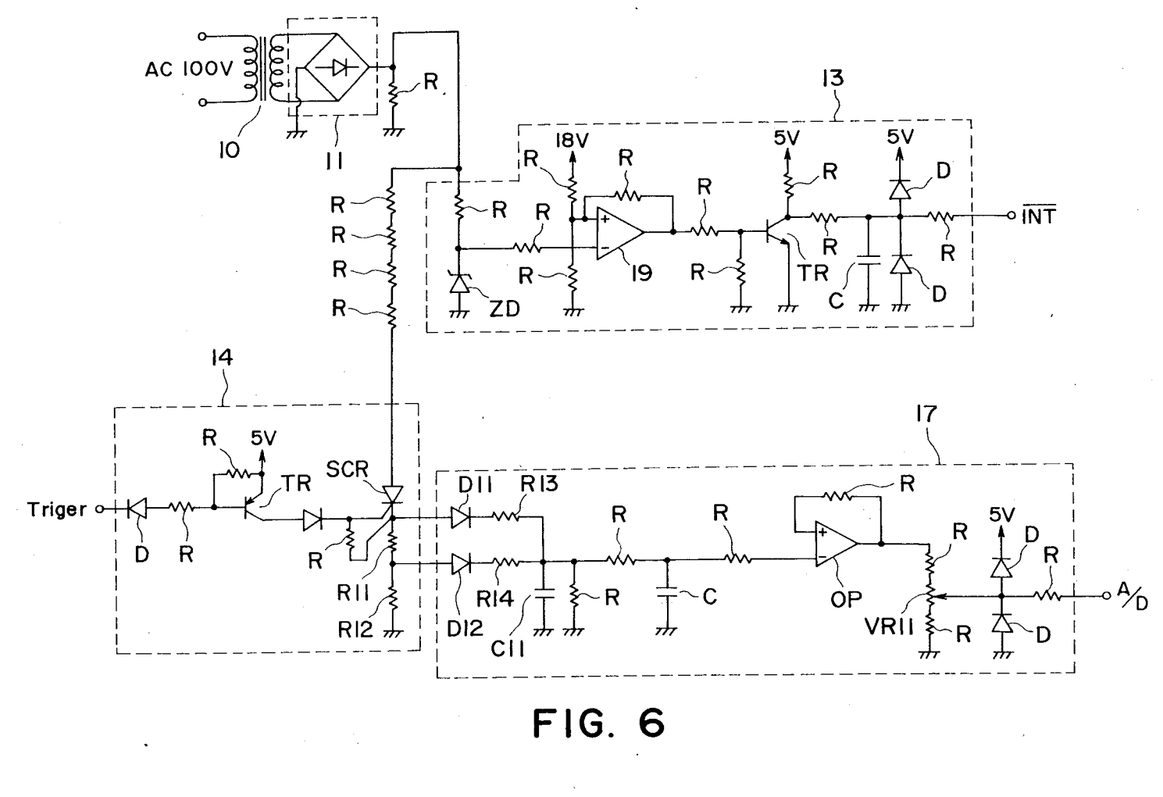
FIG. 6 shows a detail of the control circuit.

FIG. 6 shows a detailed circuit diagram of the full-wave rectifier 11, the zero-crossing signal generator 13, the halogen lamp turn-on voltage generator 14 and the integration circuit 17 shown in FIG. 17. R denotes resistors of predetermined resistances, C denotes capacitors, D denotes diodes, ZD denotes a zener diode, TR denote transistors, SCR denotes a thyristor and VR denotes a potentiometer.

The full-wave rectified voltage from the full-wave rectifier 11 is applied to the zero-crossing signal generator 13 including an operational amplifier 19. When the voltage drops below approximately two volts, the zero-crossing signal is generated and it is applied to the terminal $\overline{INT}$ of the microcomputer 12.

The voltage from the full-wave rectifier 11 is also applied to the thyristor SCR of the halogen lamp turn-on voltage generator 14. The thyristor SCR is made conductive by the trigger signal from the microcomputer 12 to effect a firing angle control for the applied voltage so that a halogen lamp turn-on voltage waveform analogous to the voltage waveform actually applied to the halogen lamp is generated.

The generated halogen lamp turn-on voltage is divided by the resistors R11 and R12 and the divided voltages are applied to the integration circuit 17.

The integration circuit 17 is a two-input integration circuit. The two input divided voltages are charged in the capacitor C11 through the diode D11 and the resistor R13, and the diode D12 and the resistor R14, respectively, and the integrated voltage is applied to the terminal A/D of the microcomputer 12 as the monitor voltage. The two-input integration circuit is used because it is the effective value of the applied voltage that actually effects to control of the halogen lamp turn-on voltage and a one-input integration circuit can detect only the mean value of the applied voltage and causes a control error. Thus, the two-input integration circuit is used to correct the error of the applied voltage due to the effective value control and the mean value control so that the potential charge in the capacitor C1 is corrected to essentially correspond to the effective value potential. Further, a time constant (CR) of the two-input integration circuit can be set smaller than that of the one-input integration circuit and a distortion of the power supply can be absorbed by the integration circuit. Thus, very precise control is attained.

As described above, the charged potential of the capacitor C11 is applied to the terminal A/D of the microcomputer as the monitor voltage through the operational amplifier OP and the potentiometer VR11. By changing the resistance of the potentiometer VR11, the voltage applied to the halogen lamp can be changed so that a desired light intensity is set. The microcomputer 12 controls the output timing of the trigger signal such that the monitor voltage applied to the terminal A/D is always kept constant. By adjusting the potentiometer VR11, the charge of the capacitor C11 to supply the constant potential to the terminal A/D can be varied. When the resistance of the potentiometer VR11 is changed in a direction to extend the charge time of the capacitor C11, the halogen lamp turn-on voltage is controlled to be higher, and when the resistance is changed in the direction to shorten the charge voltage, the turn-on voltage is controlled to be lower. As a result, the light intensity of the halogen lamp is varied.

Figure 7A:
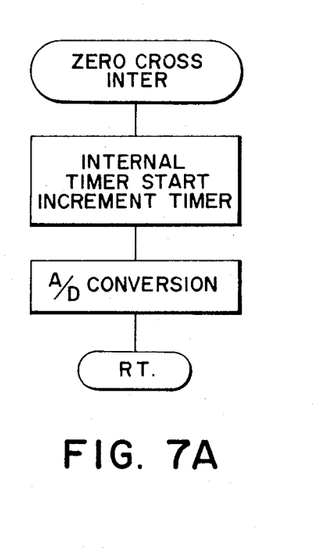
FIGS. 7A to 7B are flow charts showning a control program.
Figure 7B:
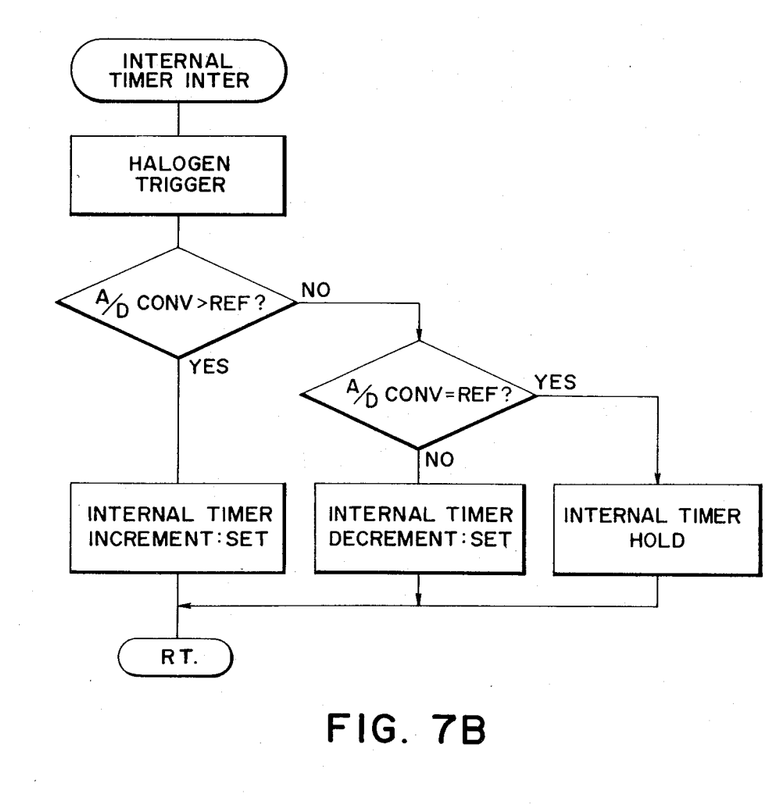

FIG. 7 shows a flow chart of a program for the turn-on control by the microcomputer 12. FIG. 7(A) shows a zero-crossing interrupt program which is executed by the zero-crossing signal applied to the terminal $\overline{INT}$, and FIG. 7(B) shows an internal timer interrupt program which is executed when an internal timer for generating the trigger signal of the microcomputer 12 reaches a predetermined count.

The internal timer of the microcomputer 12 used in the present embodiment is an increment timer which increments from a preset initial count and stops when the count reaches a predetermined count.

When the zero-crossing signal is applied to the terminal $\overline{INT}$, the zero-crossing interrupt program is started to start the internal timer from the preset initial value, read in the monitor voltage applied to the terminal A/D and A/D-convert it and set the converted value to a predetermined memory area. Then, the process returns to the main sequence.

When the internal timer increments to the predetermined count, the internal timer interrupt program is started to supply the trigger signal to turn on the halogen lamp 15 to the semiconductor switching device 16. The A/D converted digital value of the monitor voltage stored in the memory is compared with a reference value for obtaining a preset light intensity. If the digital value is smaller than the reference value, it is determined that the halogen voltage is lower than the reference and the initial value of the internal timer is incremented by one to advance the triggering point and reduce the timer time to reach the predetermined count so that the halogen voltage is increased.

If the digital value is higher than the reference, it is determined that the halogen voltage is higher than the reference and the initial value of the internal timer is decremented by one to retard the triggering point and extend the timer time to reach the predetermined count so that the halogen voltage is lowered.

If the digital value is equal to the reference, the initial value of the timer is not changed. In this manner, the digital value of the monitor voltage is compared with the reference and the initial value of the timer is set. Then, the process returns to the main sequence.

In this manner, the monitor voltage is read in at the same point in each cycle with recept to the zero-crossing point, and the A/D converted value of the monitor voltage is compared with the reference corresponding to the desired light intensity to determining the following trigger timing, and the halogen lamp is phase-controlled at the trigger timing to maintain the light intensity of the halogen lamp at the constant level.

While the turn-on control of the halogen lamp is shown in the present embodiment, the present invention is applicable to the control of the other light source or heat source, or to the drive control of a motor. The timing to detect the monitor voltage may be a predetermined time later than the zero-crossing point.

As described hereinabove, the present embodiment controls the energization of the load based on the monitor voltage detected at the constant point. Accordingly, the energization of the load can be precisely controlled. Further, since the energization is controlled by the monitor voltage which is corrected to be approximate to the effective value, the control error of the load which is controlled by the effective value can be reduced.

Further, since the closed loop control is used, that is, the phase-controlled applied voltage is detected and the triggering point for the phase control is determined by the detected voltage, a stable load operation is assured.

What I claim is:
1. A load control unit comprising:
   a load operable according to an amount of power supplied thereto;
   means for detecting a power supply voltage for operating said load; and
   control means for effecting a digital processing to control the amount of power supplied to said load; said control means comprising means for converting the voltage detected by said detecting means into a digital value, and said control means being operable to form logarithmic data corresponding to the digital value from said converting means and to determine the amount of power to be supplied in accordance with the logarithmic data.

2. A load control unit according to claim 1, wherein said detecting means is adapted to detect the voltage of an AC power supply.

3. A load control unit according to claim 1, wherein said control means is adapted to control a triggering angle of an AC power supply for operating said load.

4. A load control unit according to claim 1, wherein said control means comprises a table for generating data, indicating the amount of power to be supplied, upon addressing with logarithmic data.

5. A load control unit according to claim 1, wherein said detecting means is adapted to detect the power supply voltage in each half cycle of an AC power supply.

6. A load control unit according to claim 1 further comprising means for arbitrarily setting an operation state of said load, wherein said control means is adapted to determine the amount of power supplied through a processing of logarithmic data corresponding to an output from said setting means and logarithmic data corresponding to the digital value from said converting means.

7. A load control unit according to claim 1, wherein said load is a light source, and a light intensity of said light source varies in accordance with the energization.

8. A load control unit comprising:
   a load operable according to the amount of power supplied thereto;
   means for detecting a power supply voltage for operating said load;
   means for arbitrarily setting an operation state of said load; and
   control means for effecting a digital processing to control the amount of power supplied to said load, said control means comprising means for converting the voltage detected by said detecting means into a first digital value and converting the operation state set by said setting means into a second digital value, and said control means being operable to form first logarithmic data corresponding to the first digital value and second logarithmic data corresponding to the second digital value, and to determine the amount of power to be supplied in accordance with the first and second logarithmic data.

9. A load control unit according to claim 8, wherein said control means is adapted to control a triggering angle of an AC power supply for operating said load.

10. A load control unit according to claim 8, wherein said detecting means is adapted to detect the voltage of an AC power supply.

11. A load control unit according to claim 8, wherein said control means comprises a table for generating data, indicating the amount of power to be supplied, upon addressing with logarithmic data.

12. A load control unit according to claim 8, wherein said detecting means is adapted to detect the power supply voltage in each half cycle of an AC power supply.

13. A load control unit according to claim 8 wherein said load is a light source and a light intensity of said light source varies in accordance with the voltage applied thereto.

14. A load control unit comprising:
a load operable with an AC power supply:
zero-crossing detection means for detecting zero-crossing points of said AC power supply;
voltage detection means for detecting a voltage supplied to said load; and
control means for effecting a digital processing to control the amount of power supplied to said load, said control means comprising means responsive to the detection of zero-crossing points by said zero-crossing detection means for converting the voltage detected by said voltage detection means into a digital value, and said control means being operable to determine the amount of power to be supplied in accordance with the digital value from said converting means.

15. A load control unit according to claim 14, wherein said control means is adapted to control a triggering angle of said AC power supply.

16. A load control unit according to claim 14, wherein said voltage detection means is adapted to detect the effective voltage.

17. A load control unit according to claim 14, wherein said control means is adapted to determine the amount of supplied power though a comparison of the digital value from said converting means and a reference value.

18. A load control unit according to claim 14 wherein said load is a light source and a light intensity of said light source varies in accordance with the voltage applied thereto.

19. A load control unit comprising:
a load operable with an AC power supply which is phase controlled by trigger signals;
means for approximately detecting an effective voltage applied to said load under the phase control; and
control means for effecting a digital processing to control an output timing of the trigger signals for phase control, said control means comprising means for converting the effective voltage detected by said detecting means into a digital value, and said control means being operable to determine the output timing of the trigger signals in accordance with the digital value from said converting means.

20. A load control unit according to claim 19, wherein said detecting means is adapted to detect in order the effective voltages in response to the zero-crossing points of the AC power supply.

21. A load control unit according to claim 19, wherein said control means is adapted to determine the amount of supplied power through a comparison of the digital value from said converting means and a reference value.

22. A load control unit according to claim 19 wherein said load is a light source and a light intensity of said light source varies in accordance with the voltage applied thereto.

23. A load control unit according to claim 1, wherein said control means comprises a table for generating the logarithmic data upon addressing it with the digital value.

24. A load control unit according to claim 8, wherein said control means is operable to perform addition of the first logarithmic data and the second logarithmic data and to determine the amount of power to be supplied in accordance with the result of the addition.

25. A load control unit according to claim 8, wherein said control means comprises first and second tables for generating the first logarithmic value and the second logarithmic value, respectively, upon addressing it with the first digital value and the second digital value.

* * * * *